(12) United States Patent
Kim et al.

(10) Patent No.: US 11,292,124 B2
(45) Date of Patent: Apr. 5, 2022

(54) ECHINODERM INSPIRED VARIABLE STIFFNESS SOFT ACTUATOR CONNECTED OSSICLE STRUCTURE AND ROBOT APPARATUS COMPRISING THE SAME

(71) Applicant: Korea Advanced Institute of Science and Technology, Daejeon (KR)

(72) Inventors: Jung Kim, Daejeon (KR); Hwayeong Jeong, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 141 days.

(21) Appl. No.: 16/804,651

(22) Filed: Feb. 28, 2020

(65) Prior Publication Data

US 2020/0306955 A1 Oct. 1, 2020

(30) Foreign Application Priority Data

Mar. 26, 2019 (KR) .................. 10-2019-0033980
Jul. 4, 2019 (KR) .................. 10-2019-0080434
Nov. 11, 2019 (KR) .................. 10-2019-0143107

(51) Int. Cl.
 *B25J 9/10* (2006.01)
(52) U.S. Cl.
 CPC ........... *B25J 9/1005* (2013.01); *B25J 9/1075* (2013.01)

(58) Field of Classification Search
 CPC ....... B25J 9/1005; F16C 11/10; F16C 11/103; A61B 90/50; A61B 2090/508
 USPC ..... 248/276.1, 288.51; 403/56, 90; 600/228, 600/229
 See application file for complete search history.

(56) References Cited

U.S. PATENT DOCUMENTS

| | | | |
|---|---|---|---|
| 5,544,968 A * | 8/1996 | Goellner | B23Q 1/5462 248/181.1 |
| 7,399,272 B2 * | 7/2008 | Kim | A61B 17/02 600/201 |
| 7,913,584 B2 * | 3/2011 | Arnold | B25J 18/025 74/490.06 |
| 8,550,989 B2 * | 10/2013 | Dohi | A61B 1/0016 600/144 |
| 10,149,672 B2 * | 12/2018 | Halkos | A61B 17/0206 |
| 2002/0014567 A1 * | 2/2002 | King | F16M 11/14 248/276.1 |
| 2012/0157788 A1 * | 6/2012 | Serowski | A61B 17/0206 600/229 |

* cited by examiner

*Primary Examiner* — William C Joyce
(74) *Attorney, Agent, or Firm* — BakerHostetler

(57) ABSTRACT

Various embodiments provide a variable stiffness soft actuator inspired by an ossicle structure of echinoderm and a robot apparatus including the same. According to various embodiments, the soft actuate includes a plurality of ossicle elements arranged in a specific structure, wherein an interval between the plurality of ossicle elements is maintained or reduced depending on vacuum generation to change the stiffness of the soft actuator.

18 Claims, 9 Drawing Sheets

ECHINODERM INSPIRED VARIABLE STIFFNESS SOFT ACTUATOR CONNECTED OSSICLE STRUCTURE AND ROBOT APPARATUS COMPRISING THE SAME

CROSS-REFERENCE TO RELATED APPLICATIONS

A claim for priority under 35 U.S.C. § 119 is made to Korean Patent Applications No. 10-2019-0033980 filed on Mar. 26, 2019, No. 10-2019-0080434 filed on Jul. 4, 2019, No, 10-2019-0143107 filed on Nov. 11, 2019 in the Korean Intellectual Property Office, the entire contents of which are hereby incorporated by reference.

BACKGROUND

Embodiments of the inventive concept described herein relate to a variable stiffness soft actuator inspired by an ossicle structure of echinoderm and a robot apparatus including the same.

A soft actuator refers to a configuration of a robot which is made of a material having high flexibility, such as a material forming a living organism and has a smooth interaction with surroundings. The soft actuator has potential to interact safely with a human, and their ability to adapt to shape and stiffness to an environment, making them easy to deal with objects, which are easily broken or deformed. These characteristics suggest possibility for soft actuators to be breakthroughs in rehabilitation robots and many other applications that require human-robot interaction. The inherent flexibility of the material, however, results a reduction in an effective load that the soft actuator is capable of withstanding, limiting an application range of the soft actuator. Accordingly, variable stiffness has been highly expected in a field of the soft actuator.

SUMMARY

Embodiments of the inventive concept provide a variable stiffness soft actuator and a robot apparatus including the same.

Embodiments of the inventive concept provide a variable stiffness soft actuator inspired by an ossicle structure of echinoderm and a robot apparatus including the same.

According to an exemplary embodiment, a variable stiffness soft actuator may include a plurality of ossicle elements arranged in a specific structure, wherein an interval between the plurality of ossicle elements may be maintained or reduced depending on vacuum generation to change the stiffness of the soft actuator.

According to an exemplary embodiment, a robot apparatus may include a soft actuator and a pneumatic device that generates a vacuum in the soft actuator to change stiffness of the soft actuator, wherein the soft actuator may include a plurality of ossicle elements arranged in a specific structure, wherein an interval between the plurality of ossicle elements may be maintained or reduced depending on vacuum generation to change the stiffness of the soft actuator.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Various embodiments propose a variable stiffness mechanism inspired by an ossicle structure of an echinoderm. The echinoderm is a phylum of an animal which lives in the sea, and corresponds to sea lilies, sea urchins, sea cucumbers, starfish, and spider starfish.

A body wall of the echinoderm changes its stiffness through physical and structural properties of an ossicle, a muscle between ossicles and a connective tissue. A variable collagenous tissue, which makes up the connective tissue, produces more than ten-fold stiffness change in seconds by neural signals. Furthermore, the tissues have an irregular mesh structure and ossicles are arranged in gaps between the tissues. Due to this irregular mesh structure, when there is no deformation, there is little interaction between the ossicle and a surrounding tissue but when deformation occurs in any direction, shapes of the gaps in which the ossicles are located changed by tensile stress to generate an interaction between the ossicles and tissues. This interaction generates compressive stress in the ossicles to increase the resistance to an external load and consequently increase the effective stiffness. Therefore, an additional stiffness change is provided in addition to the stiffness change by physical properties of the tissue. The muscle between the ossicles has a composition ratio less than 1%, which does not directly change the stiffness, but maintains a position of the ossicles. Therefore, the muscle allows the position of the ossicles to remain unchanged after major deformation or stress relaxation. An absolute stiffness value is determined by properties or thickness of the tissue.

A shape in which the ossicles are arranged also affects the stiffness. Some species of echinoderm has a structure in which ossicles are arranged in an overlapping manner, which provides a higher stiffness than an in-line structure. When a flexible layer is positioned between stiff layers, a part in contact with the stiff layer has greater stiffness against compression or tilting because movement in a parallel direction is limited. Therefore, also in case of echinoderm, overlapping array of ossicle allowing flexible layer to be located between rigid layers gives more resistance on bending compared to an in-line array structure. Hereinafter, various embodiments of the inventive concept will be described with reference to the accompanying drawings.

Figure 1:
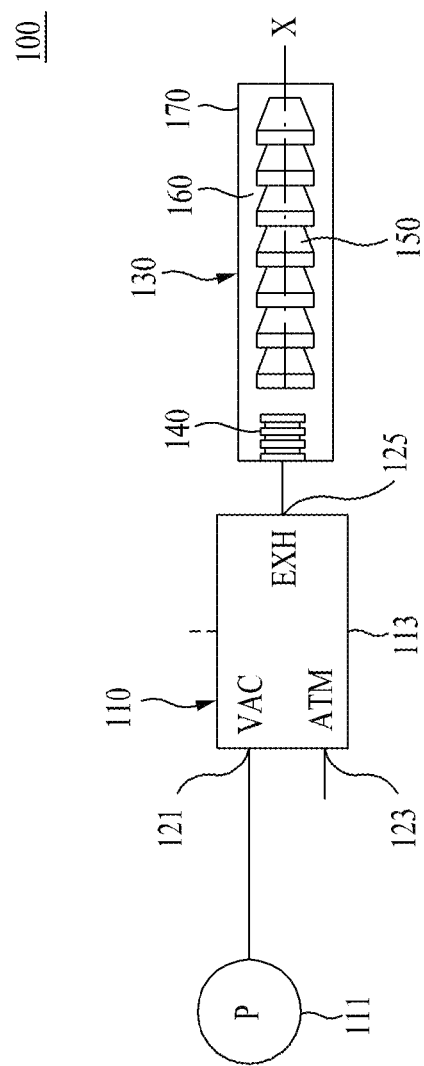
FIG. 1 is a diagram illustrating a robot apparatus including a soft actuator according to various embodiments.
Figure 2:
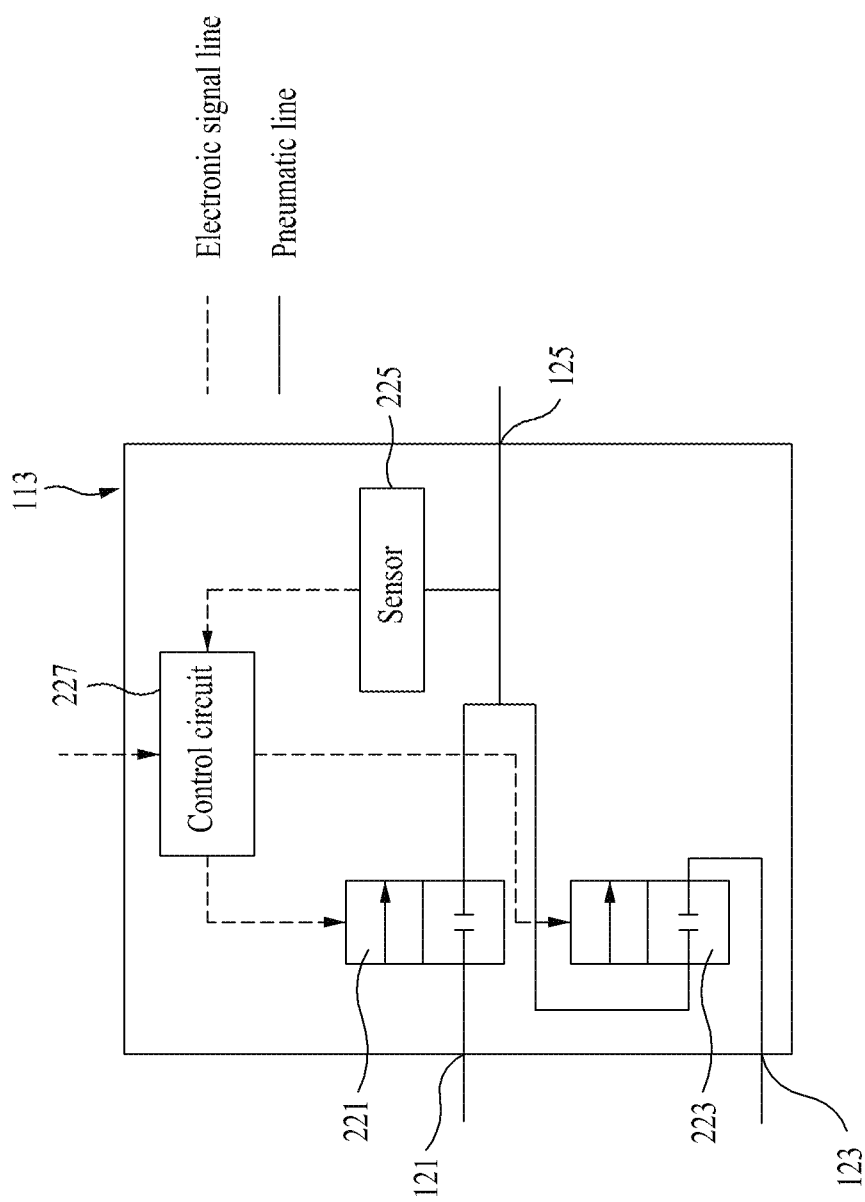
FIG. 2 is a diagram illustrating a control module of FIG. 1.
Figure 3:
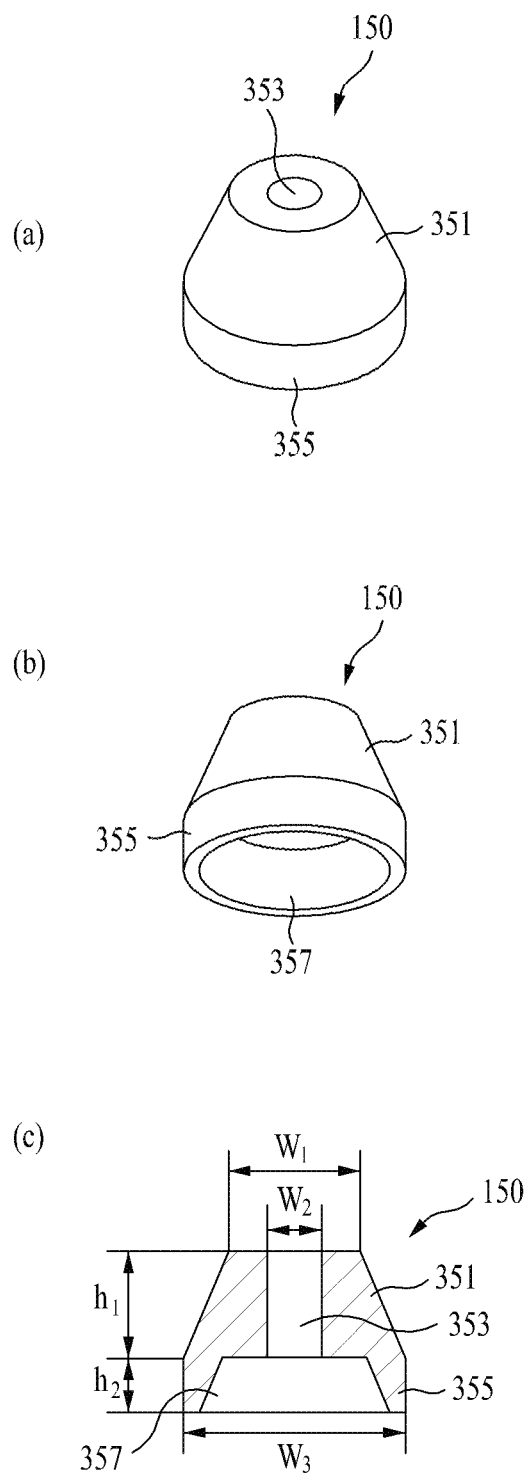
FIG. 3 is a diagram illustrating an ossicle element of FIG. 1.

FIG. 1 is a diagram illustrating a robot apparatus 100 including a soft actuator 130 according to various embodiments. FIG. 2 is a diagram illustrating a control module 113 of FIG. 1. FIG. 3 is a diagram illustrating an ossicle element 150 of FIG. 1.

Referring to FIG. 1, the robot apparatus 100 according to various embodiments may include a pneumatic device 110 and the soft actuator 130.

The pneumatic device 110 may adjust a degree of vacuum of the soft actuator 130. Here, the pneumatic device 110 may adjust the degree of vacuum of the soft actuator 130 between an atmospheric pressure and an absolute vacuum. The pneumatic device 110 may include a vacuum pump 111 and the control module 113.

The vacuum pump 111 may generate a vacuum in the soft actuator 130. To this end, the vacuum pump 111 may suck air from the soft actuator 130.

The control module 113 may be connected between the vacuum pump 111 and the soft actuator 130. The control module 113 may control to generate a vacuum in the soft actuator 130 through the vacuum pump 111. In this case, the control module 113 may adjust the degree of vacuum of the soft actuator 130. For example, the control module 113 may include three vents 121, 123, and 125, that is, the first vent 121, the second vent 123, and the third vent 125. The first vent 121 may be connected to the vacuum pump 111. The second vent 123 may be configured to provide outside air. The third vent 125 may be connected to the soft actuator 130.

The control module 113 may include a first valve 221, a second valve 223, a sensor 225, and a control circuit 227 as shown in FIG. 2. The first valve 221 may be disposed in the first vent 121 to open and close the first vent 121. The second valve 223 may be disposed in the second vent 123 to open and close the second vent 123. The sensor 225 may be disposed in the third vent 125 to detect the degree of vacuum of the soft actuator 130. The control circuit 227 may control at least one of the first valve 221 or the second valve 223. Here, the control circuit 227 may control at least one of the first valve 221 or the second valve 223 while checking the vacuum degree of the soft actuator 130 through the sensor 225. Alternatively, the control circuit 227 may control at least one of the first valve 221 or the second valve 223 based on a control command received from an external device (not shown).

The control circuit 227 may open the first vent 121 to allow the vacuum pump 111 to suck gas from the soft actuator 130. Accordingly, the vacuum may be generated in the soft actuator 130. The control circuit 227 may open the first vent 121 and the second vent 123 to allow the vacuum pump 111 to suck external air as well as the air of the soft actuator 130. As a result, the degree of vacuum of the soft actuator 130 may be adjusted. The control circuit 227 may close the first vent 121 and the second vent 123 to allow the vacuum pump 111 not to suck the air from the soft actuator 130 and to allow the external air not to flow into the soft actuator 130. Therefore, the degree of vacuum of the soft actuator 130 may be maintained. The control circuit 227 may close the first vent 121 and open the second vent 123 to allow the external air to flow into the soft actuator 130. Thus, the degree of vacuum of the soft actuator 130 may be adjusted, and further, the vacuum of the soft actuator 130 may be released.

The soft actuator 130 may operate based on a variable stiffness. That is, the stiffness of the soft actuator 130 may be variable. The stiffness of the soft actuator 130 may vary depending on change of the degree of vacuum of the soft actuator 130. Here, when the degree of vacuum of the soft actuator 130 is increased, the stiffness of the soft actuator 130 may be increased, and when the degree of vacuum of the soft actuator 130 is decreased, the stiffness of the soft actuator 130 may be decreased. The soft actuator 130 may include a nozzle connector 140, a plurality of ossicle (spicle) elements 150, a porous member 160, and a coating layer 170.

The nozzle connector 140 may be provided for external connection of the soft actuator 130. In this case, the nozzle connector 140 may be connected to the control module 113. The nozzle connector 140 may provide a passage of the air in the soft actuator 130. Here, the nozzle connector 140 may be connected to the third vent 125 of the control module 113.

The ossicle elements 150 may be arranged in a specific structure. Here, the ossicle elements 150 may be arranged in a line along one axis "X". The ossicle elements 150 may be spaced at a specific interval "I". As the degree of vacuum of the soft actuator 130 increases, the interval "I" of the ossicle elements 150 may be reduced. In this case, the ossicle elements 150 may overlap. To this end, the ossicle elements 150 may be formed in an overlap structure in which any one of the ossicle elements 150 accommodates another one of the ossicle elements 150. Each ossicle element 150 may include a head portion 351 and an accommodating portion 355, as shown in FIG. 3.

The head portion 351 may be disposed on the one axis "X". Here, a cross-sectional area "W1" of the head portion 351 may be defined as a plane perpendicular to the one axis "X". The cross-sectional area "W1" of the head portion 351 may be formed to gradually narrow in one direction on the one axis "X". The head portion 351 may include a through portion 353 for passing air. The through portion 353 may penetrate the head portion 351 along the one axis "X". Here, a cross-sectional area "W2" of the through portion 353 may be defined as a plane perpendicular to the one axis "X", similar to the cross-sectional area "W1" of the head portion 351, and narrower than the cross-sectional area "W1" of the head portion 351. In this case, a height "h1" of the head portion 351 may be defined to be parallel to the one axis "X" and the height "h1" of the through portion 353 may be the same as the height "h1" of the head portion 351.

The accommodating portion 355 may be coupled to one side of the head portion 351 on the one axis "X". Here, the accommodating portion 355 may be coupled to one side of the head portion 351 on the one axis "X" in the other direction. Here, a cross-sectional area "W3" of the accommodating portion 355 may be defined as a plane perpendicular to the one axis "X". The cross-sectional area "W3" of the accommodating portion 355 may be constant. The cross-sectional area "W3" of the accommodating portion 355 may be formed wider farther from the head portion 351. In addition, the cross-sectional area "W1" of the head portion 351 may be formed narrower farther from the accommodating portion 355. The accommodating portion 355 may include an opening 357 for passing the air. The opening 357 may be opened opposite the head portion 351 while surrounding the accommodating portion 355 on the one axis X. That is, the opening 357 may open in the other direction on the one axis "X". The opening 357 may penetrate the accommodating portion 355 and be connected to the through portion 353 of the head portion 351. Here, the height "h2" of the accommodating portion 355 may be defined in parallel with the one axis "X" and the height "h2" of the opening 357 may be the same as the height "h2" of the accommodating portion 355.

The porous member 160 may settle a position of the ossicle elements 150, while surrounding the ossicle elements 150. Therefore, the ossicle elements 150 may be arranged inside the porous member 160. The porous member 160 may have a variable density. In addition, the porous member 160 may have a variable stiffness corresponding to the variable density. The density of the porous member 160 may be variable depending on the change in the degree of vacuum of the soft actuator 130. Furthermore, the stiffness of the porous member 160 may vary depending on the density of the porous member 160. The porous member 160 may include a plurality of connected pores (pores 461 of FIG. 4).

When the degree of vacuum of the soft actuator 130 is increased, the connected pores (pores 461 of FIG. 4) may be reduced, thereby increasing the density of the porous member 160. In addition, when the density of the porous member 160 is increased, the stiffness of the porous member 160 may be increased. In addition, as the density of the porous member 160 increases, a pressure applied to the ossicle elements 150 from the porous member 160 may increase.

When the degree of vacuum of the soft actuator 130 is lowered, the connected pores (pores 461 of FIG. 4) may be restored, thereby lowering the density of the porous member 160. In addition, when the density of the porous member 160 is lowered, the stiffness of the porous member 160 may be lowered. In addition, when the density of the porous member 160 is lowered, the pressure applied to the ossicle elements 150 from the porous member 160 may be lowered.

The coating layer 170 may surround the porous member 160 and seal the porous member 160. The coating layer 170 may be in close contact with the porous member 160 to seal the porous member 160 and the ossicle elements 150 inside the porous member 160. The coating layer 170 may be assembled with the nozzle connector 140 at one side of the porous member 160.

Figure 4A:
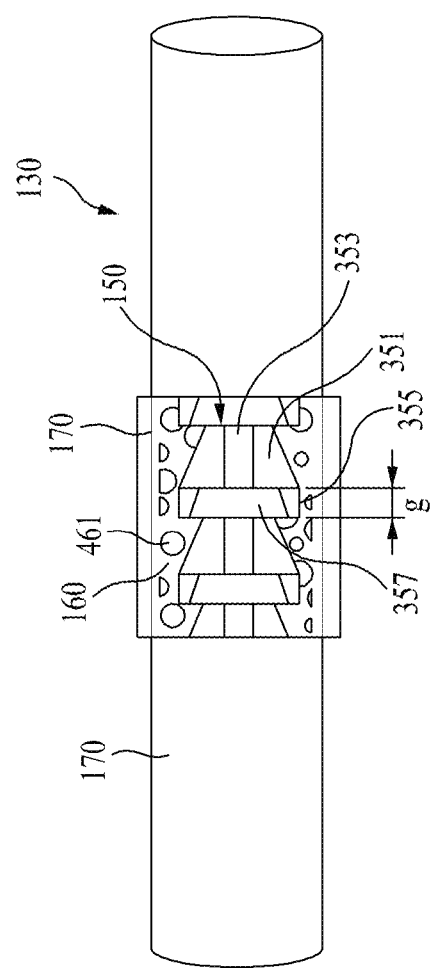
FIGS. 4A and 4B are diagrams illustrating a state change of a soft actuator according to various embodiments.
Figure 4B:
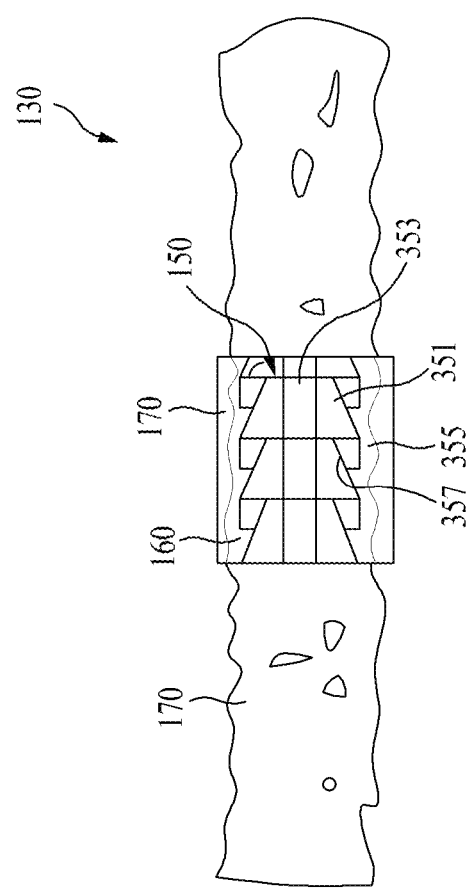

FIGS. 4A and 4B are diagrams illustrating a state change of the soft actuator 130 according to various embodiments.

Referring to FIG. 4A, when no vacuum is generated in the soft actuator 130 or the vacuum degree of the soft actuator 130 is low, the pores 461 may be maintained in the porous member 160 in the coating layer 170. In addition, the plurality of ossicle elements 150 may be arranged in a line inside the porous member 160, and the interval "I" of the ossicle elements 150 may be maintained. According to a first embodiment, the interval "I" of the ossicle elements 150 may exceed the height "h2" of the opening 357. According to a second embodiment, the interval "I" of the ossicle elements 150 may be equal to the height "h2" of the opening 357. According to a third embodiment, the interval "I" of the ossicle elements 150 may be less than the height "h2" of the opening 357. According to the third embodiment, the accommodating portion 355 of any one of the ossicle elements 150 may accommodate a portion of the head portion 351 of another one of the ossicle elements 150, and therefore, the ossicle elements 150 may overlap by a specific area.

Referring to FIG. 4B, when the vacuum occurs in the soft actuator 130, that is, when the vacuum degree of the soft actuator 130 is increased, the pores 461 are reduced in the porous member 160 in the coating layer 170. As a result, the density of the porous member 160 may be increased. When the density of the porous member 160 is increased, the stiffness of the porous member 160 may be increased, thereby increasing the stiffness of the soft actuator 130. As a result, the pressure applied to the ossicle elements 150 from the porous member 160 may be increased, thereby increasing the stiffness of the soft actuator 130. In addition, as the density of the porous member 160 increases, the interval "I" of the ossicle elements 150 may be reduced inside the porous member 160. Accordingly, the stiffness of the soft actuator 130 may be increased by overlapping the ossicle elements 150. That is, the accommodating portion 355 of any one of the ossicle elements 150 may accommodate at least a portion of the head portion 351 of another one of the ossicle elements 150. According to the first and second embodiments, the ossicle elements 150 may overlap by a specific area. According to the third embodiment, the area in which the ossicle elements 150 overlap may be increased. As a result, the stiffness of the soft actuator 130 may be higher. Accordingly, the soft actuator 130 may be deformed depending on the arrangement of the ossicle elements 150. For example, deformation, such as bending or bowing, may occur in the soft actuator 130.

Referring again to FIG. 4A, when the vacuum is released to the soft actuator 130 or the vacuum degree of the soft actuator 130 is lowered, the pores 461 are restored in the porous member 160 in the coating layer 170. As a result, the density of the porous member 160 may be lowered. When the density of the porous member 160 is lowered, the stiffness of the porous member 160 may be lowered, thereby lowering the stiffness of the soft actuator 130. In addition, when the density of the porous member 160 is lowered, the pressure applied to the ossicle elements 150 from the porous member 160 may be lowered. Thus, the interval "I" of the ossicle elements 150 inside the porous member 160 may be extended. The arrangement of the ossicle elements 150 may be restored. According to the first and second embodiments, the ossicle elements 150 may no longer overlap. According to the third embodiment, the area in which the ossicle elements 150 overlap may be reduced. As a result, the stiffness of the soft actuator 130 may be lowered.

Figure 5:
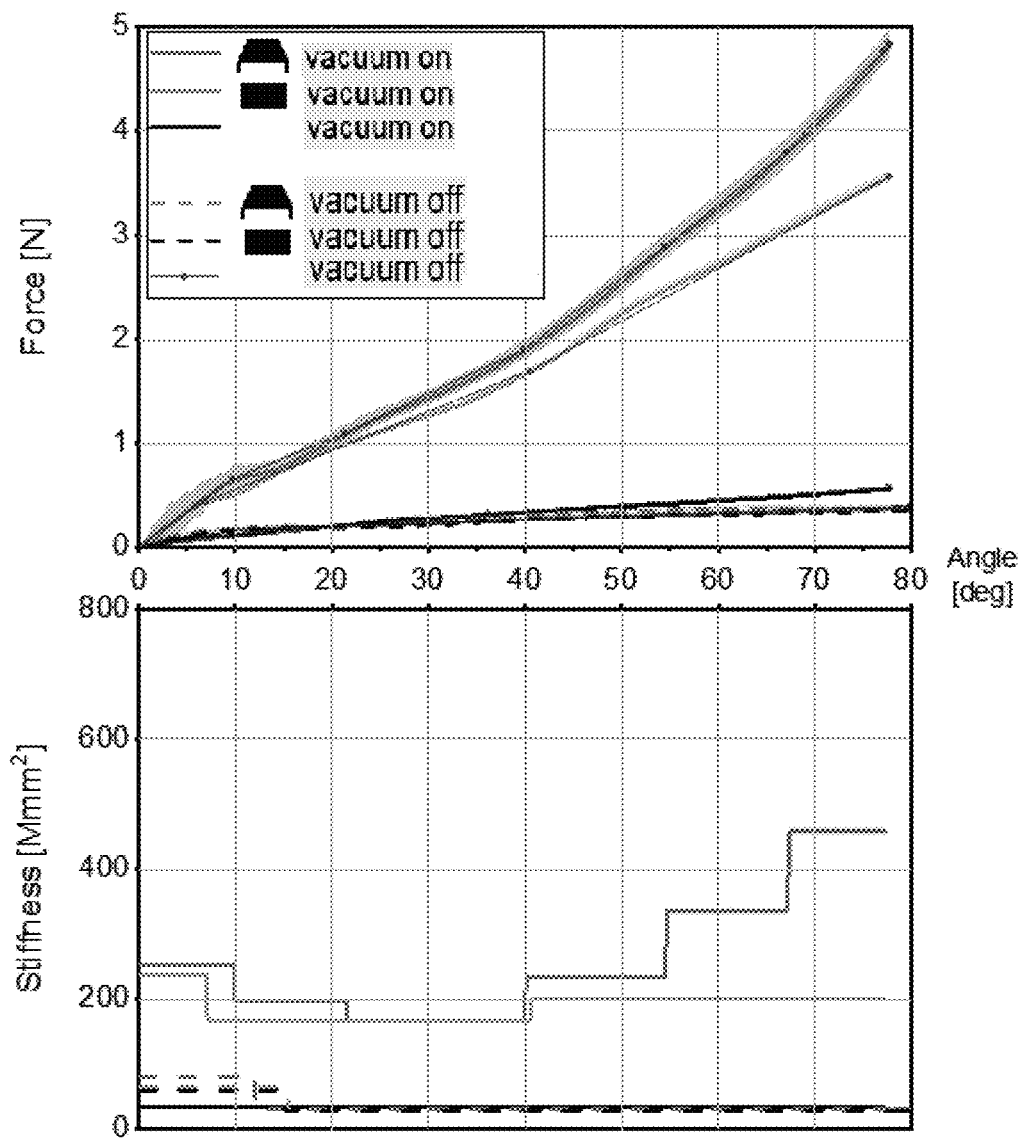
FIGS. 5, 6 and 7 are diagrams illustrating performance of a soft actuator according to various embodiments.
Figure 6:
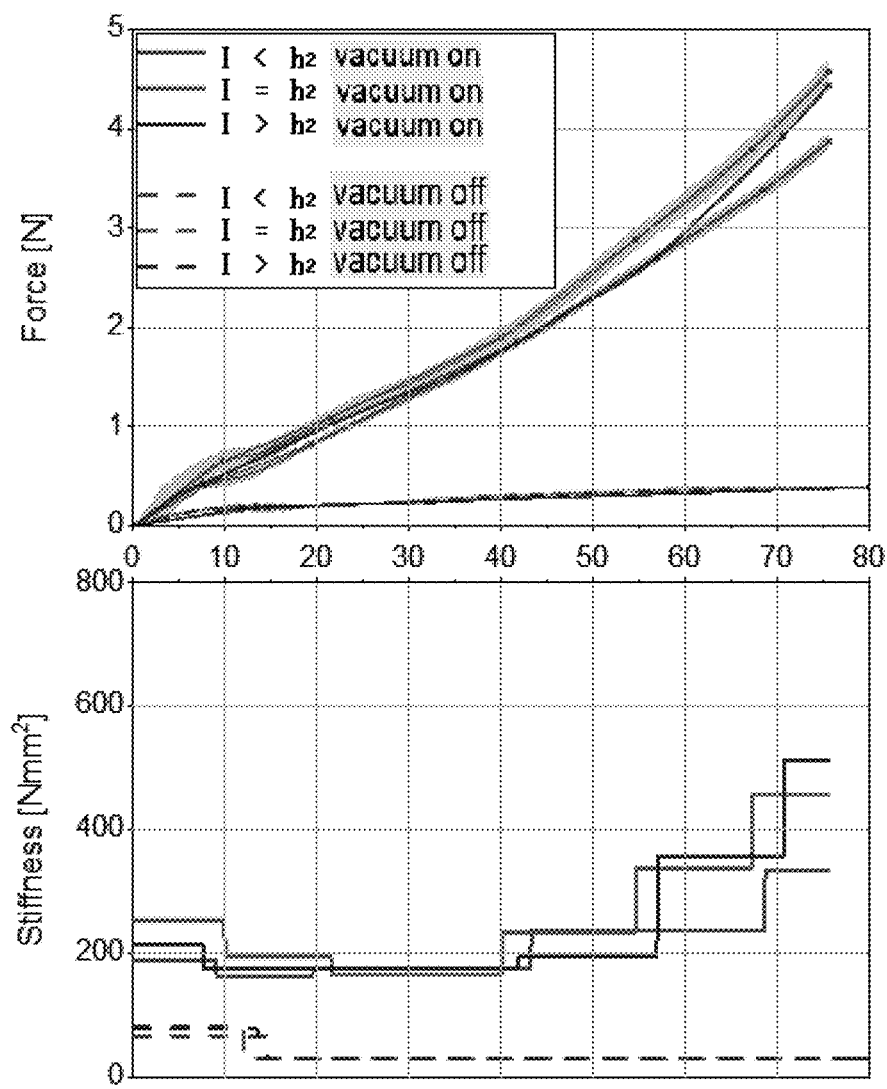
Figure 7:
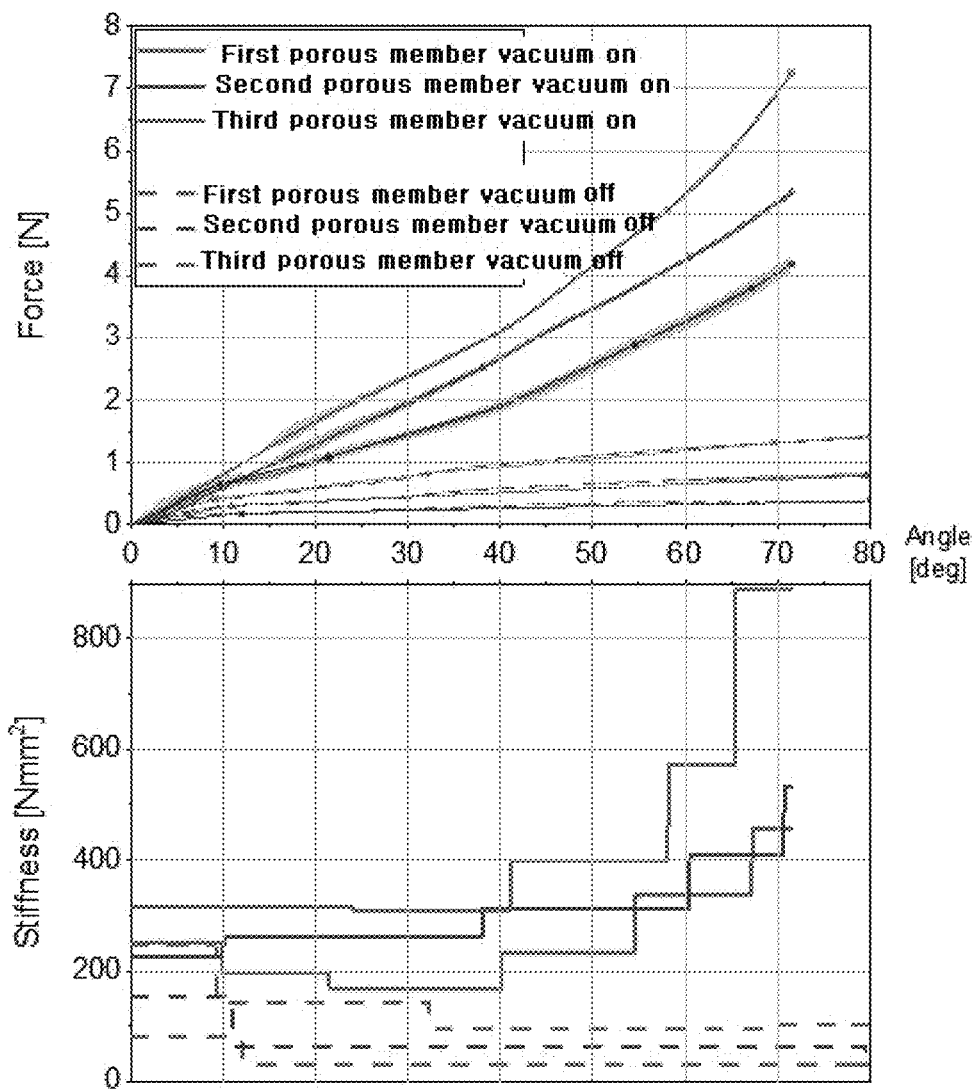

FIGS. 5, 6 and 7 are diagrams illustrating performance of the soft actuator 130 according to various embodiments.

Referring to FIG. 5, as the ossicle elements 150 according to various embodiments is implemented in a structure overlapping depending the vacuum generation, a stiffness change effect of the soft actuator 130 may be high. In detail, when no ossicle elements are arranged in the porous member 160, the stiffness of the soft actuator 130 may not change significantly in despite of the vacuum generation. In contrast, when disc shaped ossicle elements are arranged in the porous member 160, the stiffness of the soft actuator 130 may be increased depending on the vacuum generation. In this case, when the ossicle elements 150 according to various embodiments are arranged in the porous member 160, the stiffness of the soft actuator 130 may be further increased depending on the vacuum generation.

Referring to FIG. 6, there may be a slight difference in the stiffness change effect of the soft actuator 130 depending on the interval "I" of the ossicle elements 150 according to various embodiments. Specifically, the stiffness change effect of the soft actuator may be high when the interval "I" of the ossicle elements 150 at a low degree of vacuum (activated) is equal to the height "h2" of the opening 357, for example 100%, or exceeds the height "h2" of the opening 357, for example 130%, as compared to when the interval "I" of the ossicle elements 150 at the low degree of vacuum is less than the height "h2" of the opening 357, for example 70%. That is, as the ossicle elements 150 do not overlap at the low degrees of vacuum and overlap at the increased degree of vacuum (inactivated), the stiffness of the soft actuator 130 may be significantly increased.

Referring to FIG. 7, there may be a significant difference in the stiffness change effect of the soft actuator 130 depending on the characteristics of the porous member 160 according to various embodiments. In this case, an absolute stiffness of a first porous member may be less than an absolute stiffness of a second porous member and the absolute stiffness of the second porous member may be less than an absolute stiffness of a third porous member. That is, as the absolute stiffness of the porous member in the soft actuator 130 is higher, the stiffness of the soft actuator 130 may be significantly higher.

Figure 8:
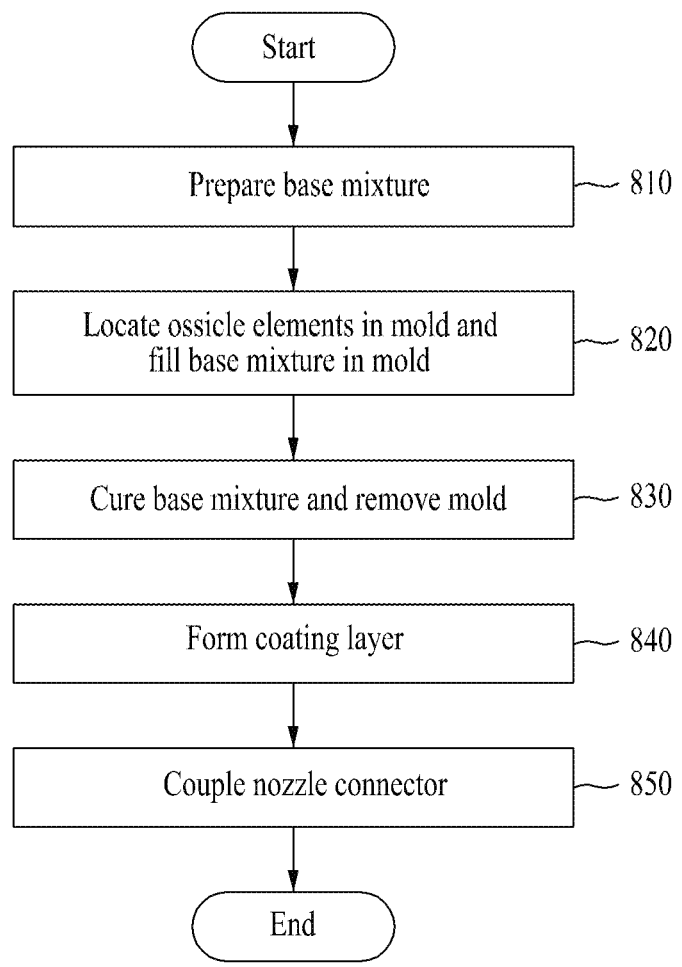
FIG. 8 is a diagram illustrating a method of manufacturing a soft actuator according to various embodiments.

FIG. 8 is a diagram illustrating a method of manufacturing the soft actuator 130 according to various embodiments.

Referring to FIG. 8, in operation 810, a base mixture may be prepared. In this case, the base mixture may include a salt and an elastomer. Meanwhile, the coating layer 170 may be prepared. In this case, the coating layer 170 may be generated by using a spin coater. For example, the spin coater may be rotated at a speed of about 600 rpm for 80 seconds, a thin layer may be produced from a raw material, and the thin layer may be cured at about 70° C. for about 15 minutes to form the coating layer 170. The coating layer 170 may have a thickness of, for example, about 0 to 0.1 mm.

In operation 820, the ossicle elements 150 may be placed in a modular mold and the base mixture may be filled in the modular mold. The ossicle elements 150 may be arranged in a specific structure. Here, the ossicle elements 150 may be arranged in a line along the one axis "X". The ossicle elements 150 may be spaced at a specific interval. In addition, the base mixture may surround the ossicle elements 150 within the modular mold and seal the ossicle elements 150. At this case, the base mixture may be interposed between the ossicle elements 150.

In operation 830, the base mixture may be cured in the modular mold and the modular mold may be removed. For example, the base mixture may be cured for about 15 minutes in an oven at about 70° C. Therefore, the porous member 160 may be formed from the base mixture. Thereafter, the modular mold may be removed from the porous member 160. In this case, the porous member 160 may be immersed in warm water of about 70° C. or less for about 12 hours. Thus, the salt may be removed from the porous member 160.

In operation 840, the coating layer 170 may be formed. The coating layer 170 may surround the porous member 160 and seal the porous member 160. Thereafter, in operation 850, the nozzle connector 140 may be assembled with the coating layer 170 at one side of the porous member 160. As a result, the porous member 160 may be sealed by the coating layer 170 and the air for the porous member 160 may be introduced into or may flow out of the coating layer 170 through the nozzle connector 140.

The robot apparatus 100 according to various embodiments may include the soft actuator 130 and the pneumatic device 110 configured to generate the vacuum in the soft actuator 130 to change the stiffness of the soft actuator 130.

The variable stiffness soft actuator 130 according to various embodiments may include the plurality of ossicle elements 150 arranged in a specific structure and the porous member 160 which surrounds the ossicle elements 150, settles the position of the ossicle elements 150, and of which the density is changed depending the vacuum generation.

According to various embodiments, the porous member 160 may include the plurality of pores 461, and when the vacuum is generated, the pores 461 may be reduced, thereby increasing the density of the porous member 160 and reducing the interval between the ossicle elements 150.

According to various embodiments, the ossicle elements 150 may have an overlapping structure.

According to various embodiments, the ossicle elements 150 may overlap as the density of the porous member 160 increases.

According to various embodiments, the ossicle elements 150 may overlap by a specific area and overlap by an area exceeding the specific area as the density of the porous member 160 increases.

According to various embodiments, the ossicle elements 150 may be arranged in a line along the one axis "X".

According to various embodiments, the ossicle elements 150 may include the head portion 351 and the accommodating portion 355 coupled to one side of the head portion 351 on the one axis "X".

According to various embodiments, the accommodating portion 355 of any one of the ossicle elements 150 may accommodate the head portion 351 of another one of the ossicle elements 150.

According to various embodiments, the accommodating portion 355 may include the opening 357 which is opened opposite the head portion 351 while surrounding the accommodating portion 355 on the one axis "X"

According to various embodiments, the head portion 351 may have the cross-sectional area defined as the plane perpendicular to the one axis "X", which is formed narrower farther from the accommodating portion 355.

According to various embodiments, the head portion 351 may include the through portion 353 passing through the head portion 351 along the one axis "X" and connected to the opening 357.

According to various embodiments, the pneumatic device 110 may adjust the degree of vacuum of the soft actuator 130 to adjust the density of the porous member 160.

According to various embodiments, the pneumatic device 110 may include the vacuum pump 111 and the control module 113 connected between the vacuum pump 111 and the soft actuator 130 and controlling to generate the vacuum to the soft actuator 130 through the vacuum pump 111.

According to various embodiments, the control module 113 may include the first valve 221 connected to the vacuum pump 111, the second valve 223 configured to provide the external air, and the control circuit 227 controlling the first valve 221 and the second valve 223 to adjust the degree of vacuum of the soft actuator 130.

According to various embodiments, the control module 113 may further include the sensor 225 which detects the degree of vacuum of the soft actuator 130.

According to various embodiments, the soft actuator 130 may operate based on variable stiffness. Here, when no vacuum is generated in the soft actuator 130, the stiffness of the soft actuator 130 may be low. As a result, the soft actuator 130 may be flexible and uncertainty of the position of each portion of the soft actuator 130 and the shape of the soft actuator 130 may be low. Meanwhile, when the vacuum is generated in the soft actuator 130, the stiffness of the soft actuator 130 may be high. Here, when the vacuum is generated in the soft actuator 130, the density of the porous member 160 may be increased, thereby increasing the stiffness of the porous member 160. As a result, the pressure applied to the ossicle elements 150 from the porous member 160 may be increased, thereby increasing the stiffness of the soft actuator 130. In addition, as the density of the porous member 160 increases, the stiffness of the soft actuator 130 may be increased by overlapping the ossicle elements 150 inside the porous member 160. As a result, a desired deformation of the soft actuator 130 may occur. Here, the deformation may occur in the soft actuator 130 depending on the arrangement structure of the ossicle elements 150. Furthermore, as the robot apparatus 100 includes the soft actuator 130, various applications may be available. Here, the degree of vacuum of the soft actuator 130 may be adjusted to use a variety of stiffness of the soft actuator 130.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in the importance or the order. It is to be understood that if an element (e.g., a first element) is referred to as "coupled to (functionally or communicatively)" or "connected to" another element (e.g., a second element), it means that the element may be coupled with the other element directly, or via the other element (e.g., a third element).

The term "module" used in the disclosure may include a unit implemented in hardware, software, or firmware and may be interchangeably used with the terms logic, logical block, part, or circuit. The module may be a minimum unit of an integrated part or may be a part thereof. The module may be a minimum unit for performing one or more functions or a part thereof. For example, the module may include an application-specific integrated circuit (ASIC).

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

What is claimed is:

1. A variable stiffness soft actuator, the soft actuator comprising:
    a plurality of ossicle elements arranged in a specific structure,
    a porous member surrounding the plurality of ossicle elements and settling a position of the plurality of ossicle elements,
    wherein an interval between the plurality of ossicle elements is maintained or reduced depending on vacuum generation to change the stiffness of the soft actuator, and wherein a density of the porous member is changed depending on the vacuum generation.

2. The soft actuator of claim 1, wherein the porous member includes a plurality of pores, and
    wherein the pores shrink when the vacuum is generated, the density of the porous member is increased and the interval between the ossicle elements is reduced.

3. The soft actuator of claim 2, wherein the ossicle elements have an overlapping structure.

4. The soft actuator of claim 3, wherein the ossicle elements overlap as the density of the porous member is increased.

5. The soft actuator of claim 3, wherein the ossicle elements overlap by a specific area and overlap by an area exceeding the specific area as the density of the porous member increases.

6. The soft actuator of claim 3, wherein the ossicle elements are arranged in a line along one axis.

7. The soft actuator of claim 6, wherein the ossicle elements includes:
    a head portion; and
    an accommodating portion coupled to one side of the head portion on the one axis.

8. The soft actuator of claim 7, wherein an accommodating portion of any one of the ossicle elements accommodates a head portion of another one of the ossicle elements.

9. The soft actuator of claim 7, wherein the accommodating portion includes an opening which is opened opposite the head portion while surrounding the accommodating portion on the one axis.

10. The soft actuator of claim 9, wherein the head portion has a cross-sectional area defined as a plane perpendicular to the one axis, which is formed narrower farther from the accommodating portion, and
    wherein the head portion includes a through portion passing through the head portion along the one axis and connected to the opening.

11. A robot apparatus comprising:
    a soft actuator; and
    a pneumatic device configured to generate a vacuum in the soft actuator to change stiffness of the soft actuator,
    wherein the soft actuator includes a plurality of ossicle elements arranged in a specific structure and an interval between the plurality of ossicle elements is maintained or reduced depending on vacuum generation to change the stiffness of the soft actuator, and wherein the soft actuator further includes a porous member which surrounds the plurality of ossicle elements, settles a position of the plurality of ossicle elements, and changes a density of the porous member depending on the vacuum generation.

12. The robot apparatus of claim 11, wherein the porous member including a plurality of pores,
    wherein the pores shrink when the vacuum is generated, the density of the porous member is increased and the interval between the ossicle elements is reduced.

13. The robot apparatus of claim 12, wherein the pneumatic device adjusts a degree of vacuum of the soft actuator to adjust the density of the porous member.

14. The robot apparatus of claim 13, wherein the pneumatic device includes:
    a vacuum pump; and
    a control module coupled between the soft actuator and the vacuum pump and controlling a vacuum to be generated in the soft actuator through the vacuum pump.

15. The robot apparatus of claim 12, wherein the ossicle elements are arranged in a line along one axis and have an overlapping structure.

16. The robot apparatus of claim 15, wherein the ossicle elements overlap as the density of the porous member is increased.

17. The robot apparatus of claim 15, wherein the ossicle elements overlap by a specific area and overlap by an area exceeding the specific area as the density of the porous member increases.

18. The robot apparatus of claim 15, wherein the ossicle elements includes,
   a head portion; and
   an accommodating portion coupled to one side of the head portion on the one axis,
   wherein an accommodating portion of any one of the ossicle elements accommodates a head portion of another one of the ossicle elements.

\* \* \* \* \*